(12) United States Patent
Martin, Jr.

(10) Patent No.: US 11,707,009 B2
(45) Date of Patent: Jul. 25, 2023

(54) CULTIVATOR

(71) Applicant: Accura FLow, LLC, Pulaski, IA (US)

(72) Inventor: Isaac Martin, Jr., Pulaski, IA (US)

(73) Assignee: ACCURA FLOW, LLC, Pulaski, IA (US)

( * ) Notice: Subject to any disclaimer, the term of this patent is extended or adjusted under 35 U.S.C. 154(b) by 13 days.

(21) Appl. No.: 17/356,371

(22) Filed: Jun. 23, 2021

(65) Prior Publication Data

US 2021/0400862 A1 Dec. 30, 2021

Related U.S. Application Data

(60) Provisional application No. 63/043,525, filed on Jun. 24, 2020.

(51) Int. Cl.
*A01B 63/20* (2006.01)
*A01B 63/26* (2006.01)
*A01B 63/00* (2006.01)
*A01B 35/08* (2006.01)

(52) U.S. Cl.
CPC ............ *A01B 63/20* (2013.01); *A01B 63/008* (2013.01); *A01B 63/26* (2013.01); *A01B 35/08* (2013.01)

(58) Field of Classification Search
CPC ....... A01B 63/20; A01B 63/008; A01B 63/26; A01B 35/08
See application file for complete search history.

(56) References Cited

U.S. PATENT DOCUMENTS

| 2,351,172 | A | * | 6/1944 | White | A01B 63/26 74/109 |
|---|---|---|---|---|---|
| 2,761,368 | A | | 9/1956 | Harrop | |
| 2,869,657 | A | | 1/1959 | Harrop | |
| 3,061,021 | A | | 10/1962 | Shader | |
| 3,921,726 | A | | 11/1975 | Connor et al. | |
| 4,195,697 | A | | 4/1980 | Griffin | |
| 4,552,225 | A | | 11/1985 | Behn et al. | |
| 4,607,705 | A | | 8/1986 | Tebben | |
| 4,819,737 | A | | 4/1989 | Frase | |
| 4,928,774 | A | | 5/1990 | Bell | |
| 5,573,072 | A | * | 11/1996 | Evans et al. | A01B 63/26 172/744 |

FOREIGN PATENT DOCUMENTS

WO 2001024603 A1 4/2001

* cited by examiner

*Primary Examiner* — Tara Mayo
(74) *Attorney, Agent, or Firm* — Goodhue, Coleman & Owens, P.C.

(57) ABSTRACT

A cultivator includes at least one cultivator row unit, each of the at least one cultivator row unit having a support assembly for securing the cultivator row unit to a tool bar, a shank, an earth working tool operatively connected to the shank, and at least one assembly for providing discrete incremental adjustment for at least one of (a) an angle of the earth working tool, (b) a depth of the earth working tool, and (c) a gauge wheel depth.

17 Claims, 22 Drawing Sheets

CULTIVATOR

RELATED APPLICATIONS

This application claims priority to U.S. Provisional Patent Application No. 63/043,525, filed Jun. 24, 2020, hereby incorporated by reference in its entirety.

FIELD OF THE INVENTION

The present invention relates generally to agricultural equipment. More particularly, but not exclusively, the present invention relates to an improved cultivator.

BACKGROUND

To assist in understanding the present invention and its need, problems regarding cultivators are discussed. It is to be understood, however, that aspects of the present invention may be applied in other applications or other types of machinery.

Cultivators are generally used to kill weeds in a field of crop by disturbing topsoil in a manner which buries the leaves of the weeds and/or uproots them. One such example of a cultivator is the International Harvester (IH). In recent times, cultivators have been used sparingly and instead of using cultivators, crop producers have focused their efforts on using herbicide weed control and genetically modified organism (GMO) crops with herbicide resistant traits.

Some crop producers have recognized advantages in growing non-GMO or organic crops. Others have had fields where it is not economically viable to apply herbicides in specific situations. In either instance, weed control is needed and thus there is a need for cultivators. Yet, there are numerous problems with conventional cultivators. In particular, cultivators are notoriously difficult to adjust and therefore it is time consuming and labor intensive for crop producers to properly adjust cultivators. Because multiple adjustments would be required for each row unit of a cultivator and because adjustments should be made whenever field conditions change, this is a significant problem. If crop producers neglect to properly configure a cultivator, then the results obtained from cultivation may be less effective than desired. In addition, many crop producers are not accustomed to or experienced in using cultivators and so may not understand how to properly adjust cultivators or the importance of doing so. For example, failure to properly use a cultivator may result in knocking over, burying, or uprooting the crop or failing to knock over, bury, or uproot weeds. Thus, due to attendant complexities and relative inexperience operators may fail to properly use conventional cultivators.

Therefore, what is needed is an improved cultivator which allows for rapid adjustments to accommodate changes in field conditions.

SUMMARY

Therefore, it is a primary object, feature, or advantage to improve over the state of the art.

It is a further object, feature, or advantage to provide a quickly adjustable or configurable cultivator.

It is a still further object, feature, or advantage to provide a cultivator with incremental adjustments to adjust gauge wheel depth, earth working tool angle, and earth working tool depth.

Another object, feature, or advantage is to provide quick adjustments for a cultivator which can be made without the use of tools.

It is a further object, feature, or advantage to provide row units for a cultivator suitable to configure into a 6-row, 8-row, or larger cultivator.

It is a still further object, feature, or advantage to provide a cultivator which is effective at weed control.

Another object, feature, or advantage is to provide a cultivator which is easy for an operator to use.

Yet another object, feature, or advantage is to provide a cultivator which includes tandem gauge wheels which allows for smoother travel.

A further object, feature, or advantage is providing a cultivator which may include fenders for further protecting crops.

A still further object, feature, or advantage of the present invention is to provide an apparatus which allows for rapid incremental adjustment for use in a cultivator, other agricultural implements, or other equipment or machinery.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by any objects, features, or advantages stated herein.

According to one aspect a cultivator includes at least one cultivator row unit, each of the at least one cultivator row unit having a support assembly for securing the cultivator row unit to a tool bar, a shank, an earth working tool operatively connected to the shank, and at least one assembly for providing discrete incremental adjustment for at least one of (a) an angle of the earth working tool, (b) a depth of the earth working tool, and (c) a gauge wheel depth. The at least one assembly for providing discrete incremental adjustment may include a gear with teeth, a handle integral with the gear and arcuate gearing having teeth engaging the teeth of the gear. The cultivator may further include a first and a second gauge wheel operatively connected to the row unit. The earth working tool may be a shovel. The cultivator may further include a first and a second fender operatively connected to the support assembly.

According to another aspect, an apparatus for use in an agricultural implement may provide discrete incremental adjustment. The apparatus may include an arcuate member with teeth extending outwardly therefrom, a gear having teeth for engaging the teeth of the arcuate member, a handle integral with the gear, and a first support member and a second support member on opposite sides of the gear having teeth.

According to another aspect, a cultivator includes at least one cultivator row unit, each of the at least one cultivator row unit including a support assembly for securing the cultivator row unit to a tool bar, a shank, an earth working tool operatively connected at a first end of the shank, arcuate gearing positioned at a second end of the shank and a first quick adjustment assembly configured for discrete incremental adjustment of position of the quick adjustment assembly relative to the arcuate gearing to adjust angle of the earth working tool relative to a ground plane. The first quick adjustment assembly may include a first handle, a second handle, and a latch such that when the first handle and the second handle are squeezed together, the quick adjustment assembly is movable relative to the arcuate gearing.

According to another aspect, a cultivator having at least one cultivator row unit is provided. Each of the at least one cultivator row unit includes a frame, a support assembly operatively connected to the frame for securing the cultivator row unit to a tool bar, a shank operatively connected to the frame, an earth working tool operatively connected to the shank, a gauge wheel assembly operatively connected to the frame, the gauge wheel assembly comprising a first gauge wheel and a second gauge wheel, and at least one quick adjustment assembly positioned to mesh with teeth of arcuate gearing such that position of the quick adjustment assembly is discretely and incrementally adjustable relative to the arcuate gearing. Each of the at least one quick adjustment assembly is configured for providing discrete incremental adjustment for one of (a) an angle of the earth working tool, (b) a depth of the earth working tool, and (c) a gauge wheel depth associated with the gauge wheel assembly. According to another aspect, a cultivator includes at least one cultivator row unit, each of the at least one cultivator row unit including a support assembly for securing the cultivator row unit to a tool bar, a shank, an earth working tool operatively connected at a first end of the shank, arcuate gearing positioned at a second end of the shank, and a first quick adjustment assembly comprising a gear having teeth for meshing with the arcuate gearing positioned at the second end of the shank wherein the quick adjustment assembly is configured for discrete incremental adjustment of position of the quick adjustment assembly relative to the arcuate gearing to adjust angle of the earth working tool relative to a ground plane. The first quick assembly may further include a handle integral with the gear. The first quick assembly may further include a fastener to secure position of the position of the quick adjustment assembly relative to the arcuate gearing. The fastener may be a latch. There may be an actuator operatively connected to the gear. There may be a second quick adjustment assembly with a gear having teeth for meshing with arcuate gearing of a linkage and positioned to provide for incrementally adjusting position of the second quick adjustment assembly relative to the arcuate gearing of the linkage to adjust depth of the earth working tool. The second quick assembly may further include a handle integral with the gear of the second quick adjustment assembly. The cultivator may further include a first gauge wheel and a second gauge wheel operatively connected to a gauge wheel assembly and a third quick adjustment assembly including a gear having teeth for meshing with arcuate gearing of the gauge wheel assembly and positioned to provide for incrementally adjusting position of the third quick adjustment assembly relative to the arcuate gearing of the gauge wheel assembly to adjust gauge wheel depth. The third quick assembly may further include a handle integral with the gear of the third quick adjustment assembly. The earth working tool may be a shovel. The cultivator may further include a first and a second fender operatively connected to the support assembly.

According to another aspect a cultivator includes at least one cultivator row unit, each of the at least one cultivator row unit includes a frame, a support assembly operatively connected to the frame for securing the cultivator row unit to a tool bar, a shank operatively connected to the frame, an earth working tool operatively connected to the shank, a gauge wheel assembly operatively connected to the frame, the gauge wheel assembly comprising a first gauge wheel and a second gauge wheel, and at least one quick adjustment assembly comprising a gear having a handle extending outwardly therefrom, the gear having a plurality of teeth and wherein teeth of the gear are positioned to mesh with teeth of arcuate gearing such that position of the quick adjustment assembly is discretely and incrementally adjustable relative to the arcuate gearing. Each of the at least one quick adjustment assembly may be configured for providing discrete incremental adjustment for one of (a) an angle of the earth working tool, (b) a depth of the earth working tool, and (c) a gauge wheel depth associated with the gauge wheel assembly. The at least one quick adjustment assembly for providing discrete incremental adjustment may include a gear with teeth and a handle integral with the gear and arcuate gearing having teeth engaging the teeth of the gear.

According to another aspect, an apparatus for use in an agricultural implement to provide discrete incremental adjustment without use of tools is provided. The apparatus includes an arcuate member with teeth extending outwardly therefrom, a gear having teeth for engaging the teeth of the arcuate member, a handle integral with the gear, a first support member and a second support member on opposite sides of the gear having teeth, and a fastener for securing the gear to the arcuate member. The fastener may be a latch. The apparatus may form a part of a row unit for a cultivator and the apparatus may be configured for providing discrete incremental adjustment for one of (a) an angle of the earth working tool, (b) a depth of the earth working tool, and (c) a gauge wheel depth associated with the gauge wheel assembly. The row unit may form a part of a cultivator.

BRIEF DESCRIPTION OF THE DRAWINGS

Illustrated embodiments of the disclosure are described in detail below with reference to the attached drawing figures, which are incorporated by reference herein.

DETAILED DESCRIPTION

The present invention includes a quick adjustment assembly for making discrete and incremental adjustments to aspects of a cultivator. In the cultivator described, there are three different types of quick adjustment assemblies described. These include a first quick adjustment assembly for an angle of an earth working tool, a second quick adjustment assembly for a depth of the earth working tool, and a third quick adjustment assembly for adjustment of a gauge wheel depth associated with the gauge wheel assembly. Each row unit of a cultivator would have multiple earth working tools. For example, a row unit of a cultivator may have 5 earth working tools, each needing angle and depth to be separately adjusted. Each row unit may further include an adjustment for a gauge wheel.

Figure 1:
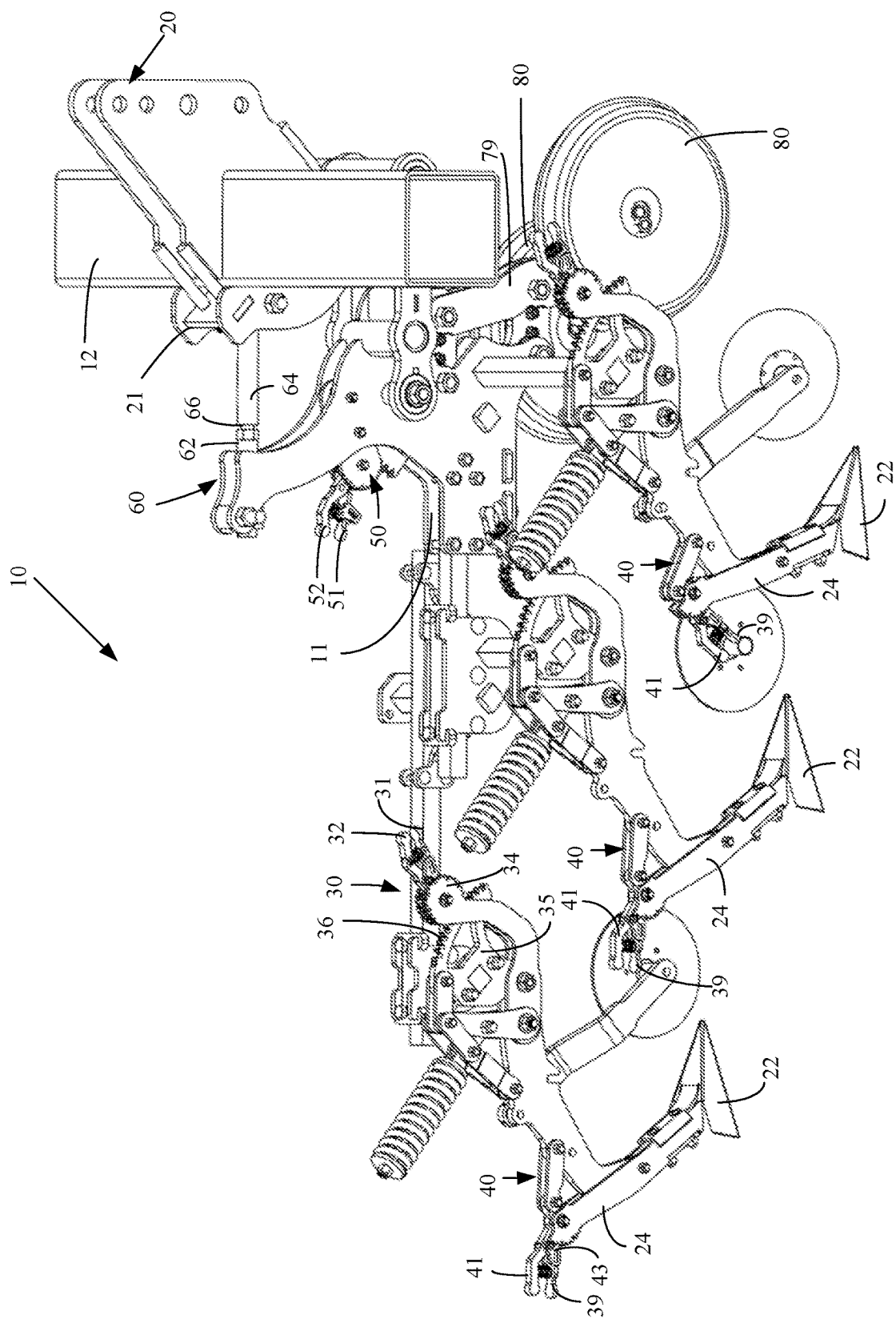
FIG. 1 illustrates one view of a cultivator row unit mounted on a toolbar.

FIG. 1 illustrates one view of a cultivator row unit 10 having a frame 11 and mounted on a toolbar 12. A main support assembly 20 is shown. The support assembly may include a bracket assembly 21 for securing the frame 11 of the cultivator row unit 10 to the toolbar 12. It is contemplated that the cultivator row unit 10 may be secured to the toolbar 12 in any number of different ways and that the bracket assembly may have different shapes and geometries.

The cultivator row unit 10 includes a plurality of different shovels, sweeps, points, or other earth working tools 22. Although the term "shovel" is generally used herein it is to be understood that a shovel is merely one type of earth working tool and other types of earth working tools may be used as may be appropriate for particular field conditions. Each of the shovels 22 is mounted to a different shank 24. The angle of each shovel relative to the ground or earth working tool angle is an important cultivator adjustment. The quick adjustment assembly 40 allows this angle to be incrementally adjusted by using handles 39, 41 to rotate the angle of the earth working tools 22. In operation, an operator may squeeze the handles 39, 41 together in order to rotate the quick adjustment assembly 40 relative to the arcuate gearing 36 and position latch 43 to secure the adjustment assembly in place to provide a desired angle of the shovel or other earth working tool 22 relative to the ground.

A quick adjustment assembly 30 is shown which has handles 31, 32 with gear 34 which meshes with arcuate gearing 36 to allow for quick incremental adjustment of the depth of the shovel or other earth working tool 22. This is another important cultivator adjustment which may need to be adjusted depending upon particular field conditions so that a sufficient amount of soil is thrown on weeds in order to slow their growth relative to the crop. In operation, an operator may squeeze the handles 31, 32 together in order to incrementally reposition the quick adjustment assembly 30 relative to the arcuate gearing 34 and then latch or otherwise secure the quick adjustment assembly 30 in place.

The incremental adjustment associated with the meshing of gears allows for a limited number of discrete positions to be selected from. This is advantageous in that while permitting a sufficient number of possible positions, it may facilitate making adjustments easier within the same row unit or between different row units. It also greatly simplifies the adjustment process for the operator so that they can better keep track of the position and can more easily return to a desired setting if desired.

A quick adjustment assembly 50 is shown which has handles 51, 52 which allows for quick incremental adjustment of the working depth of the gauge wheel(s) 80 of the gauge wheel assembly 79. As shown, tandem gauge wheels 80 provide a smoother ride. In operation, an operator may unlatch a latch if not already unlatched and squeeze the handles 51, 52 together and move the quick adjustment assembly 50 to a desired position and then secure it in place with the latch. This allows for incremental adjustment to one of a plurality of different discrete positions.

An assembly 60 is shown which includes a first tubular portion 62, a second tubular portion 64 and an interface 66 between the first tubular portion 62 and the second tubular portion 64. This assembly 60 is further shown in FIG. 9. The assembly 60 allows the length of the assembly to be increased or decreased to position the cultivator row unit relative to the toolbar.

Figure 2:
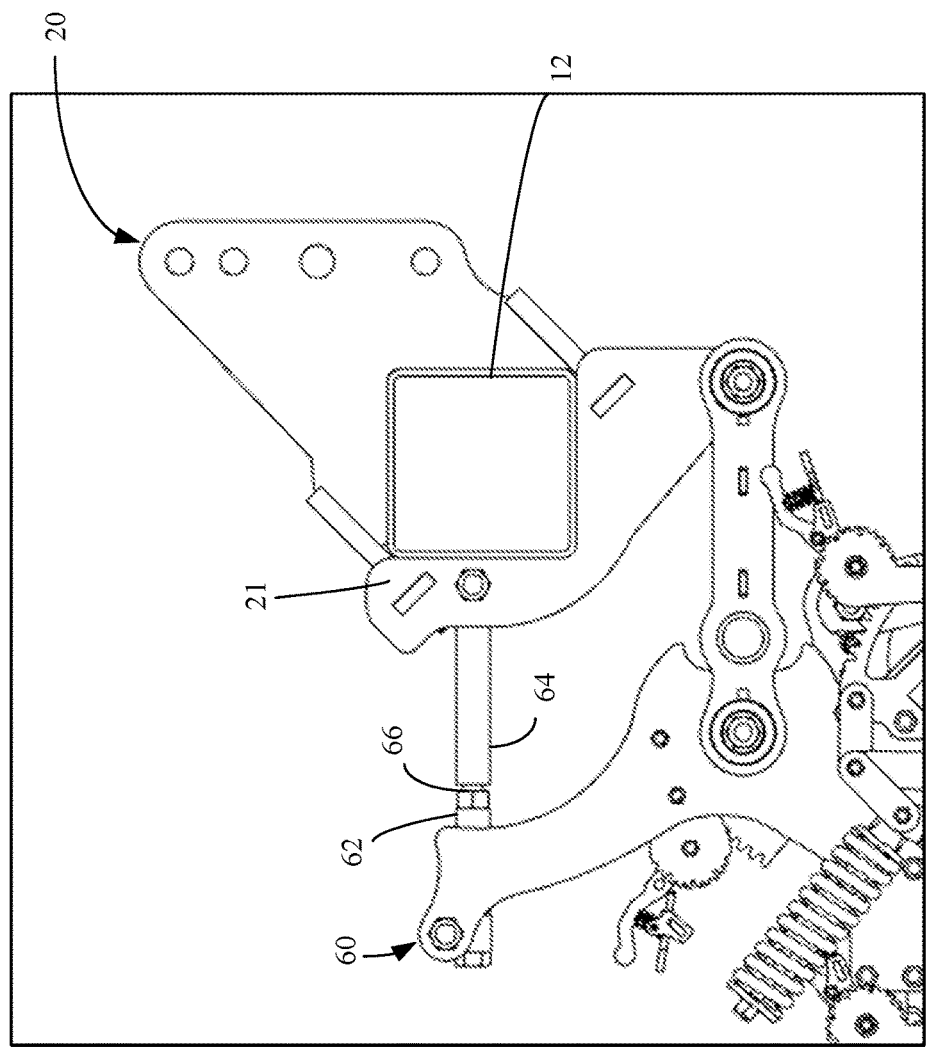
FIG. 2 is a partial view of the cultivator row unit mounted on the tool bar.

FIG. 2 is a partial view of the middle cultivator row unit mounted on the tool bar 12. The cultivator row unit shown is for a wide row. More or fewer shovels or earth working tools may be present based on the width of the row. The main support assembly 20 is shown with bracket assembly 21. Extending outwardly from the support assembly 20 is the assembly 60 with the first tubular portion 62, the second tubular portion 64, and the interface 66. The interface is a threaded region where bolts from the first tubular portion 62 and the second tubular portion 64 are positioned. V-bolts, C-bolts, or other types of bolts may be used depending upon the structure of the support assembly 20.

Figure 3A:
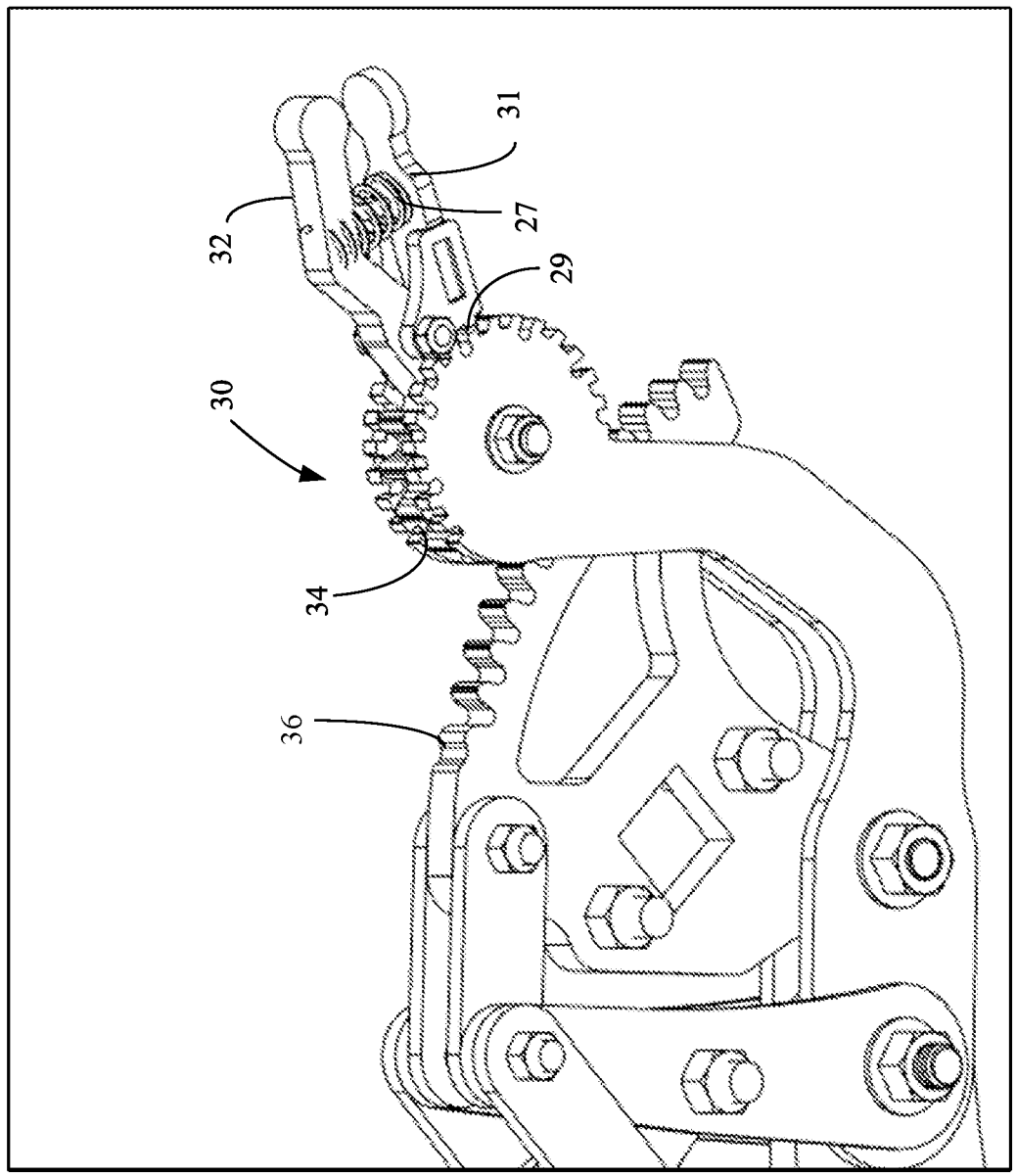
FIG. 3A is a partial view of an assembly for adjusting depth of an earth working tool such as a shovel.

FIG. 3A is a partial view of a quick adjustment assembly 30 for quick incremental adjustment of the depth of the shovel. Note that teeth from the gear 34 mesh or engagingly connect with teeth from the arcuate gearing 36. The ratio between the gears is such that the operator may quickly and easily make the adjustment as needed. The handles 31, 32 may be squeezed together, the latch 29 may be unfastened, and the quick adjustment assembly 30 may be moved to a different position and the latch 29 may then be secured in place. The latch may be considered a squeeze latch and so operation of the latch is seamless to the user, they need only squeeze the handles and then move the handles 31, 32 to the desired position and release the handles to secure the latch in place. The handles 31, 32 may be spring tensioned with a spring 27. In some embodiments there may be 17 positions which correlate to a 1⅝ inch height adjustment. Different ones of notches between the teeth of the gear may have different depths to assist the operator. For example, alternating notches may be of different depth.

Figure 3B:
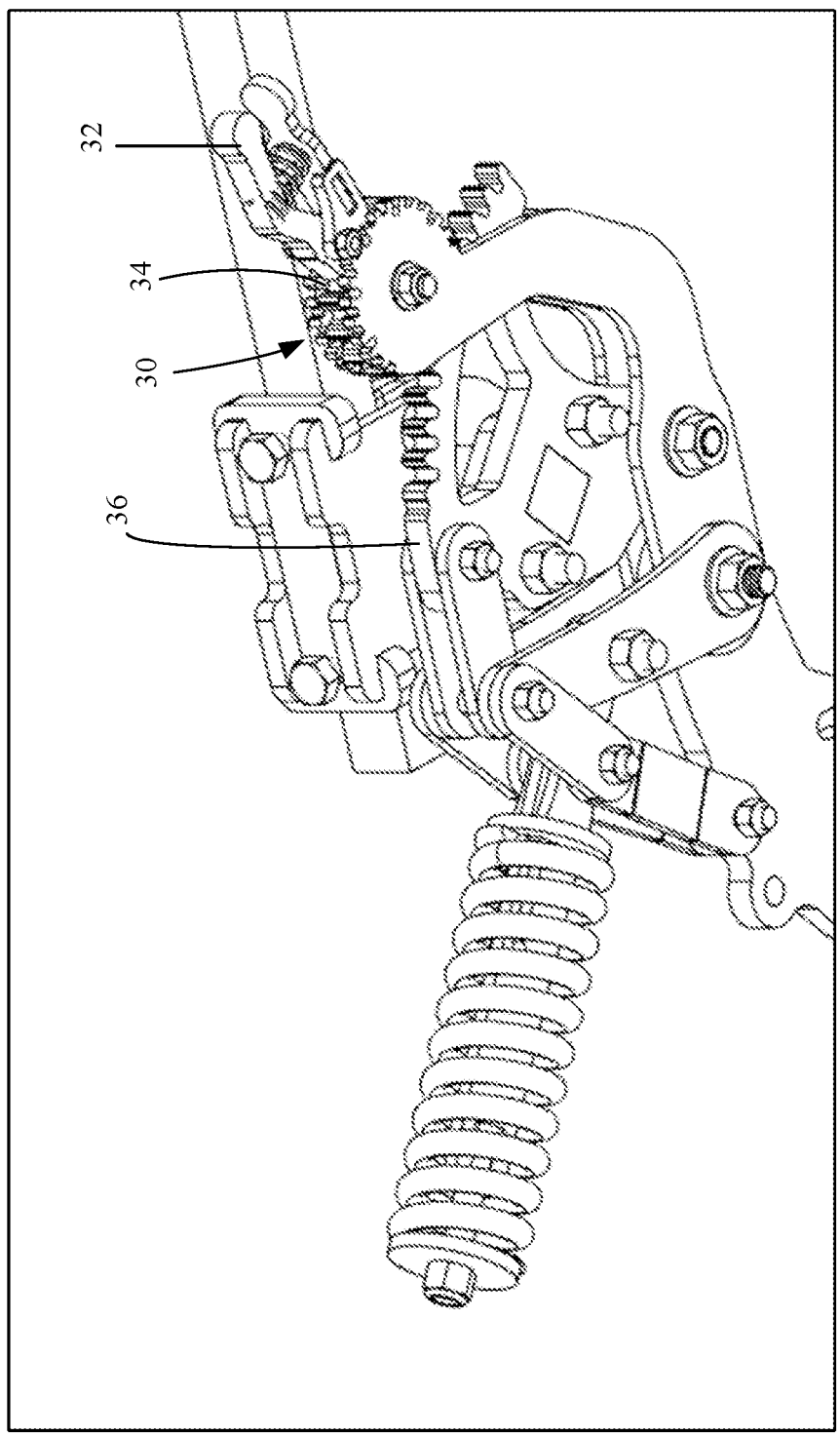
FIG. 3B is another partial view of the assembly for adjusting the depth of the earth working tool.

FIG. 3B shows another view of the quick adjustment assembly 30.

Figure 4A:
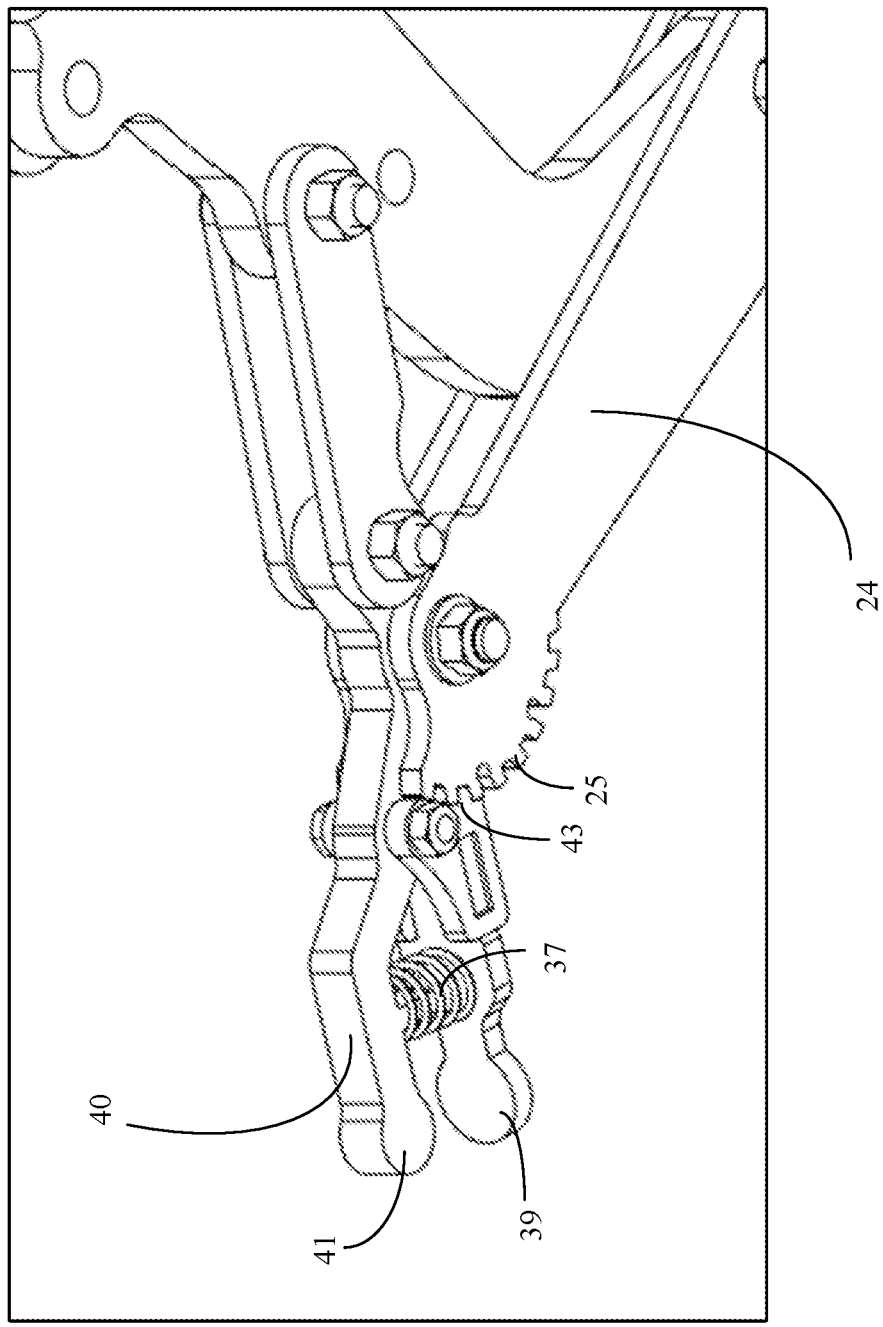
FIG. 4A is a partial view of an assembly for adjusting angle of a shovel or other earth working tool.
Figure 4B:
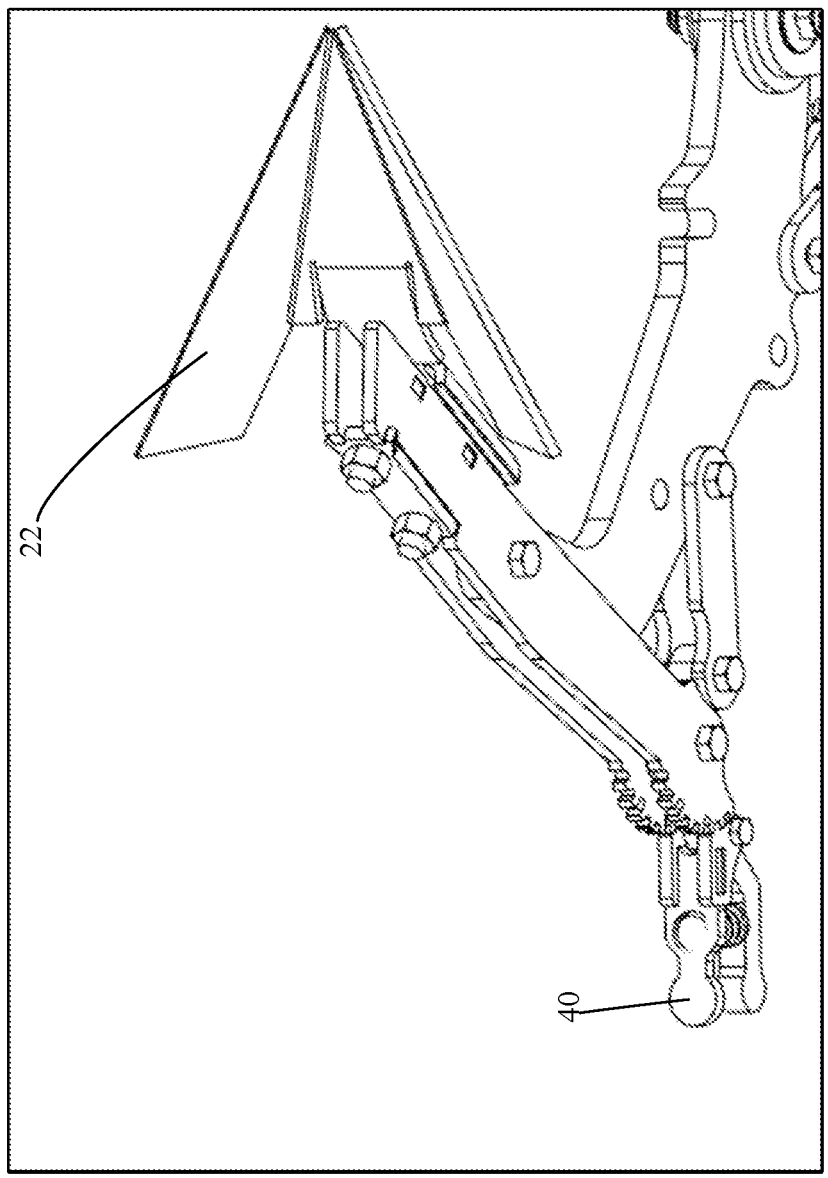
FIG. 4B is another partial view of the assembly for adjusting angle of a shovel or other earth working tool.

FIG. 4A and FIG. 4B illustrate an adjustment for adjusting angle of the shovel or other earth working tool. In FIG. 4A, the adjustment assembly 40 allows the angle to be incrementally adjusted by using handles 39, 41 to rotate the angle of the shovels. In operation, an operator may squeeze the handles 39, 41 together in order to incrementally adjust the position of the quick adjustment assembly 40 relative to teeth of a gear 25. However, note that all of the gearing present for the quick adjustment assembly 30 is present here. The handles 39, 41 may be spring tensioned with a spring 37. The latch 43 may then be positioned to secure the quick adjustment assembly in place to provide for seamless operation. The latch may be considered a squeeze latch and so operation of the latch is seamless to the user, they need only squeeze the handles and then move the handles 39, 41 to the desired position and release the handles to secure the latch in place. FIG. 4B illustrates the position of the adjustment assembly 40 in relationship with the earth working tool 22 which may be a shovel.

Figure 5:
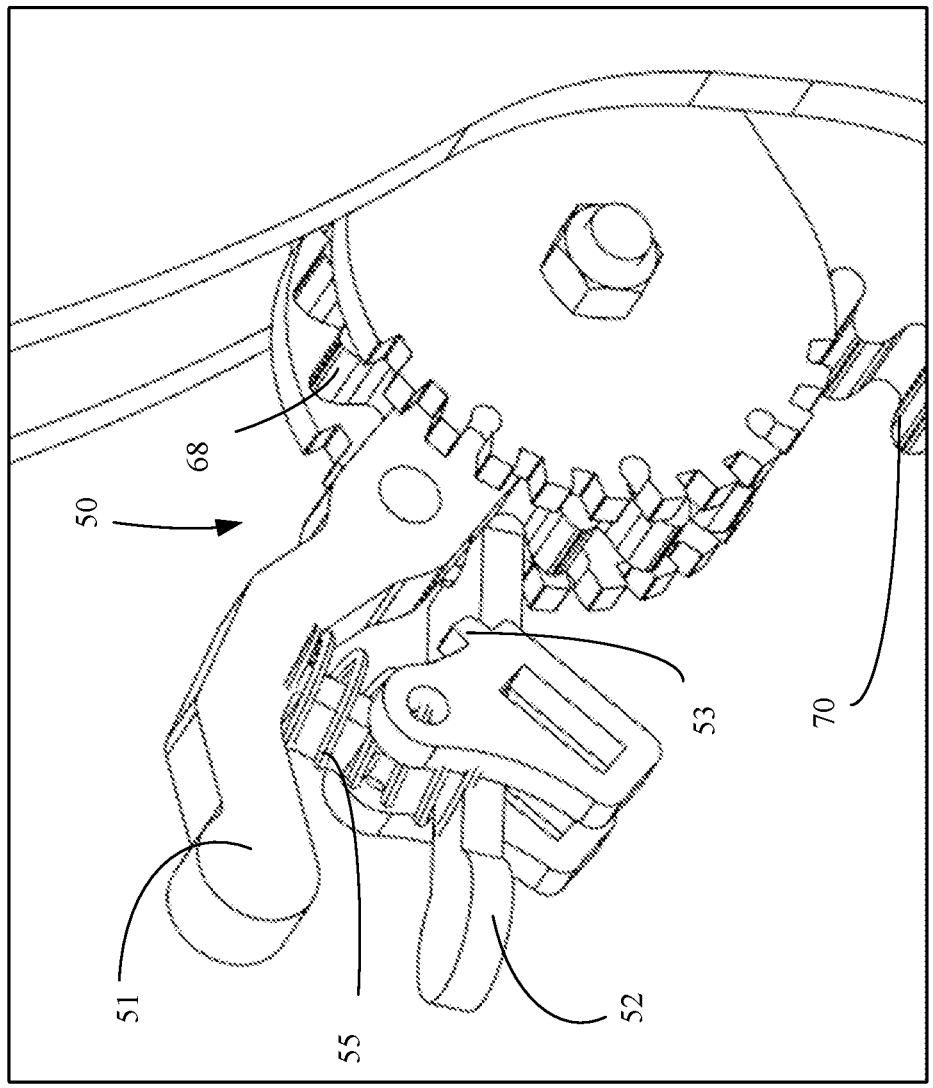
FIG. 5 is a partial view of the assembly quick release for adjusting working depth of the gauge wheel.

FIG. 5 is a partial view of the assembly 50 for adjusting working depth of the gauge wheel(s) 55. The assembly 50 has handles 51, 52 which may be spring tensioned with a spring 55. After the handles 51, 52 are used to rotate the assembly 50 moved to a desired position, the latch 53 may be positioned to secure the assembly in place at the desired position. For purposes of illustration, the latch is not assembled in FIG. 5 as it would be in normal operation as when assembled for normal operation the hole in the latch 53 would align with the hole in the handle 51. The quick adjustment assembly 50 may be the same as the quick adjustment assembly 30. As shown in FIG. 5, an inner gear 68 associated with the handle 51 is shown. Arcuate gearing 70 is also shown. The position of the assembly 50 relative to the arcuate gearing 70 may be modified by unfastening the latch 53 (if not already unfastened as shown), squeezing the handles 51, 52 together and rotating the handles 51, 52 clockwise or counterclockwise to adjust position of the inner gearing 68 relative to the arcuate gearing 70 and thereby adjusting the working depth of the gauge wheel 55.

Figure 6:
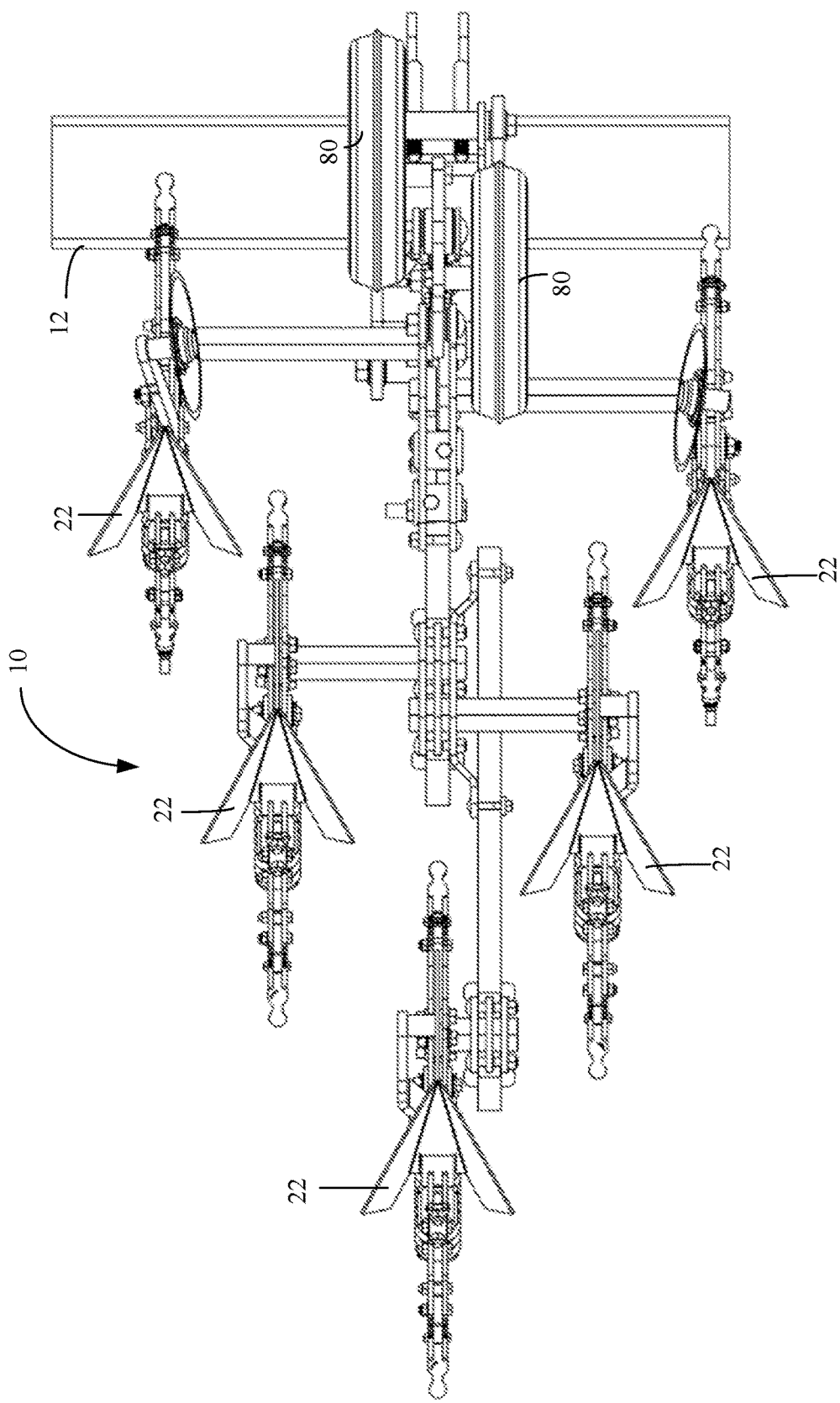
FIG. 6 is a view of a cultivator row unit mounted on the tool bard for an inner row.

FIG. 6 is a view of a cultivator row unit mounted on the tool bar for an inner row. As shown in FIG. 6, the frame includes two bars which are secured to one another. Instead of two bars, a single bar may be used which is bent. In some embodiments, the tool bar may fold to accommodate a greater number of row units.

Figure 7:
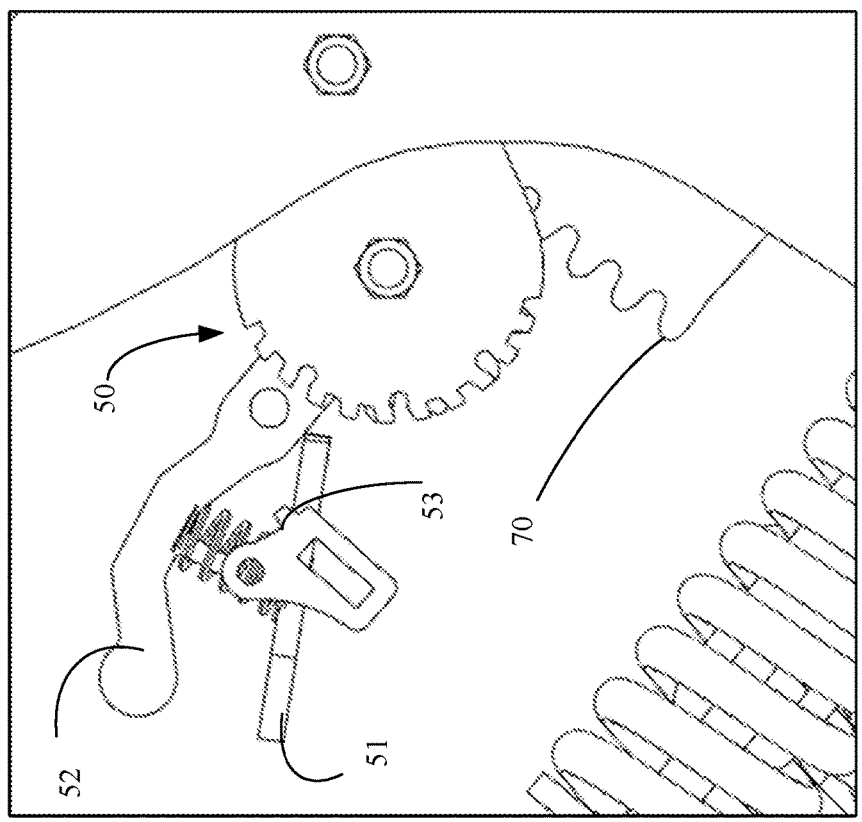
FIG. 7 is another view of an assembly for quick adjustment of working depth of the gauge wheels.

FIG. 7 is another view of an assembly for quick incremental adjustment of the working depth of the gauge wheels.

Figure 8:
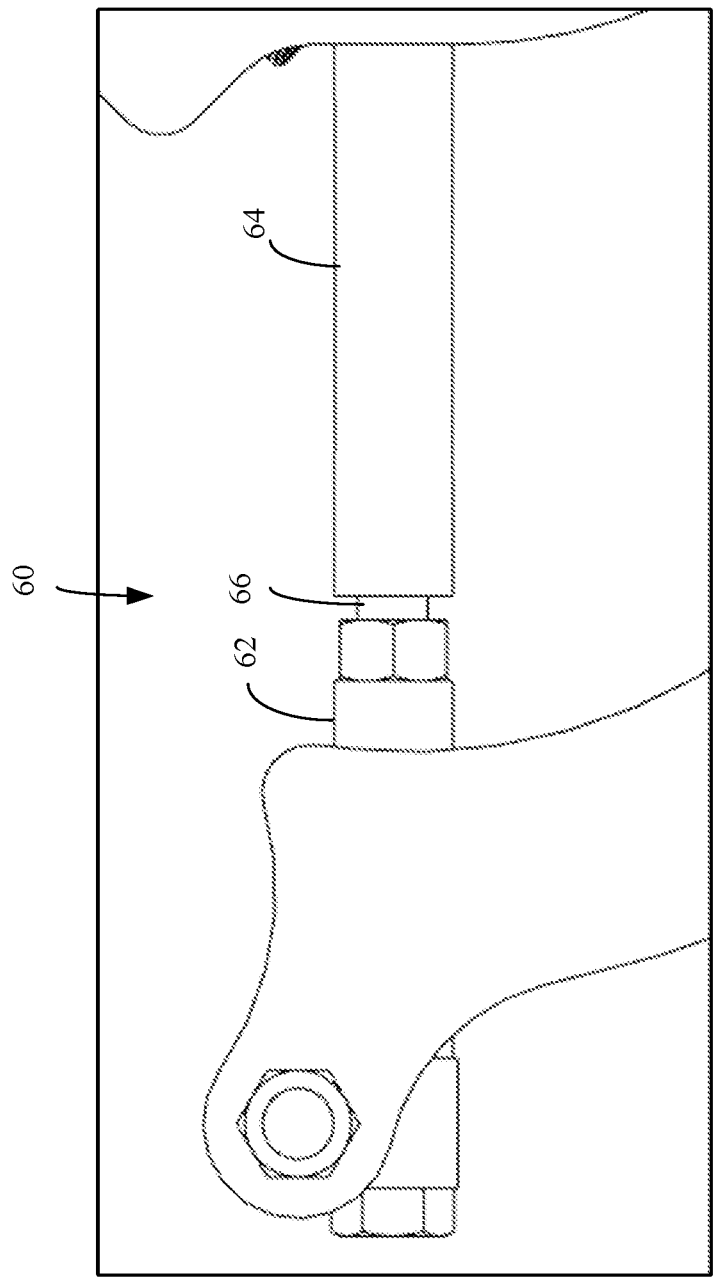
FIG. 8 is a view showing an assembly for stabilizing the row unit.

FIG. 8 is a view showing an assembly 60 operatively connected to the bracket assembly secured to the toolbar.

Figure 9:
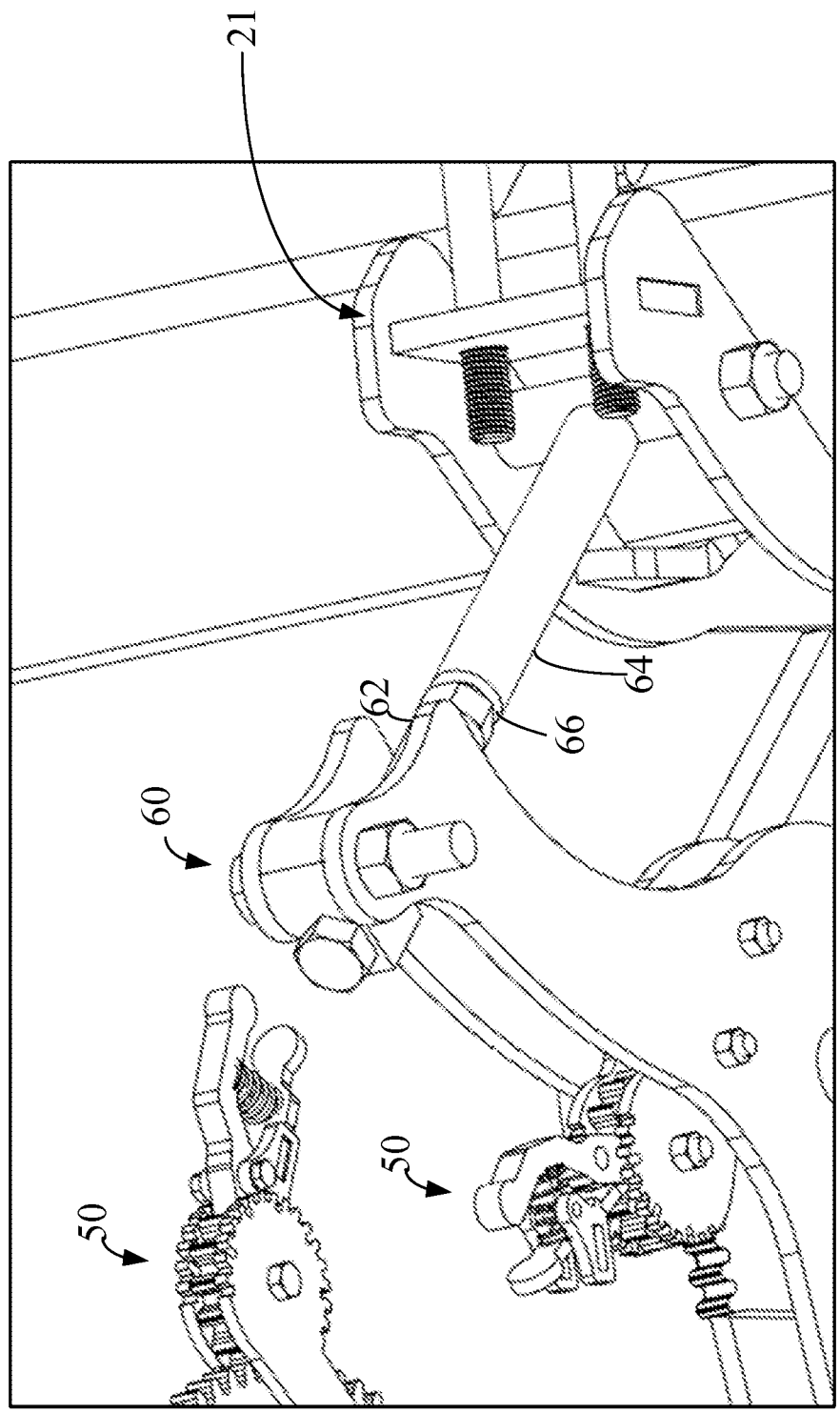
FIG. 9 is another view showing mounting of the cultivator row unit to the toolbar.

FIG. 9 is another view showing mounting of the cultivator row unit to the toolbar.

Figure 10:
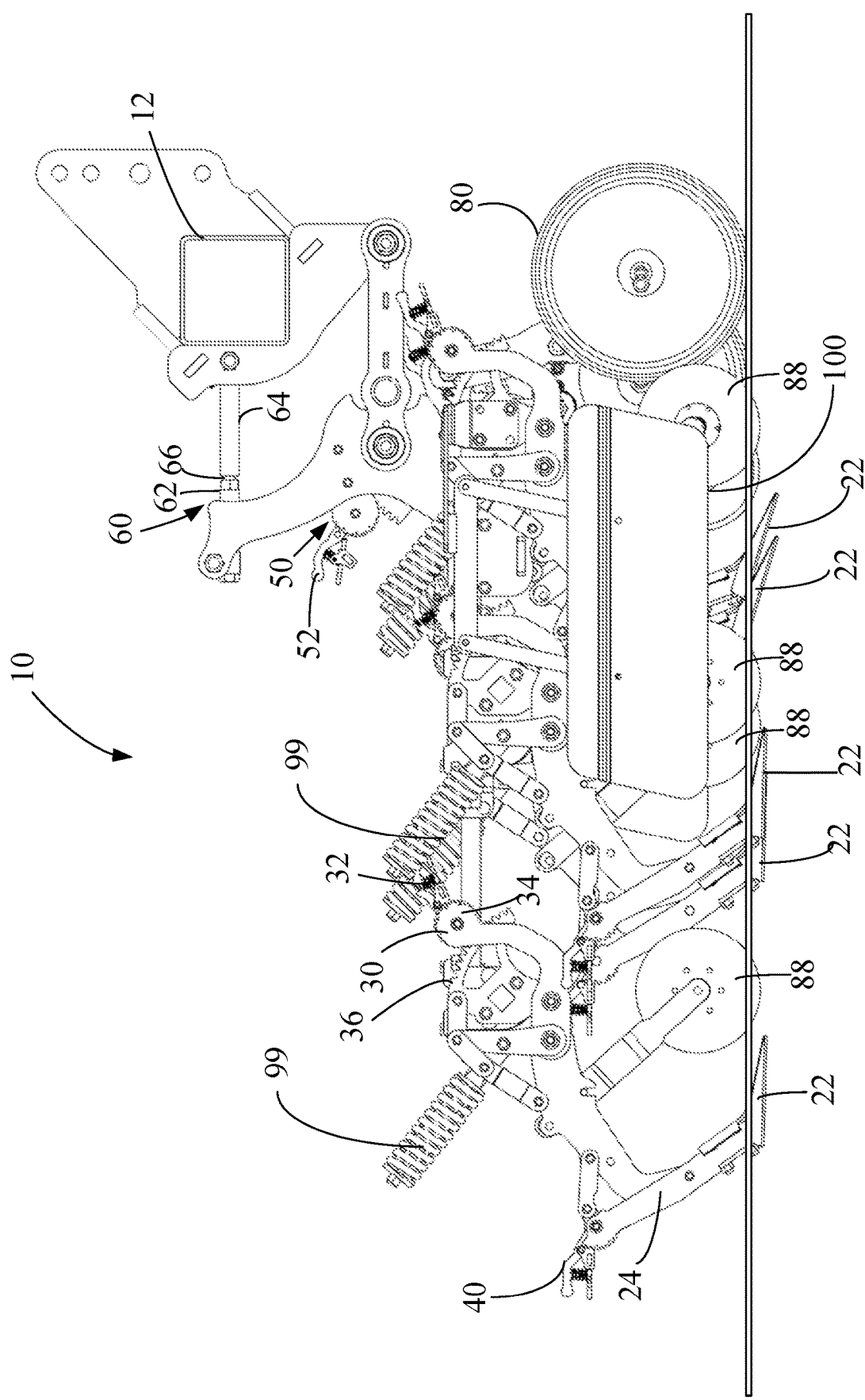
FIG. 10 illustrates a cultivator row unit mounted to a toolbar and a ground plane.

FIG. 10 illustrates a cultivator row unit mounted to a toolbar and a ground plane. The earth working tools or shovels 22 are shown at a shallow depth. A shield or fender 100 is shown which may be used to protect row crop so that dirt may be thrown up next to the row crop but without burying the row crop so that weeds next to the row crop may be buried so that the weeds are killed, or their growth is stifled. The shield or fender 100 may be raised or lowered using gearing similar to that which is used with the quick release assemblies. Each field cultivator shank may pivot upwardly such as over a rock or other obstacle. Coil springs 99 provide a downward bias to return the field cultivator shank to its previous position.

Also shown in FIG. 10 is a disc 88 which may be a cutaway disc. The disc 88 is positioned in front of the shank. The disc 88 assists in promoting a smooth and uninterrupted flow of soil by preventing plugging. The disc 88 may have its own adjustment but may move with the shank. The disc 88 may be of various dimensions. In one embodiment the disc may be about an 8-inch disc.

Figure 11:
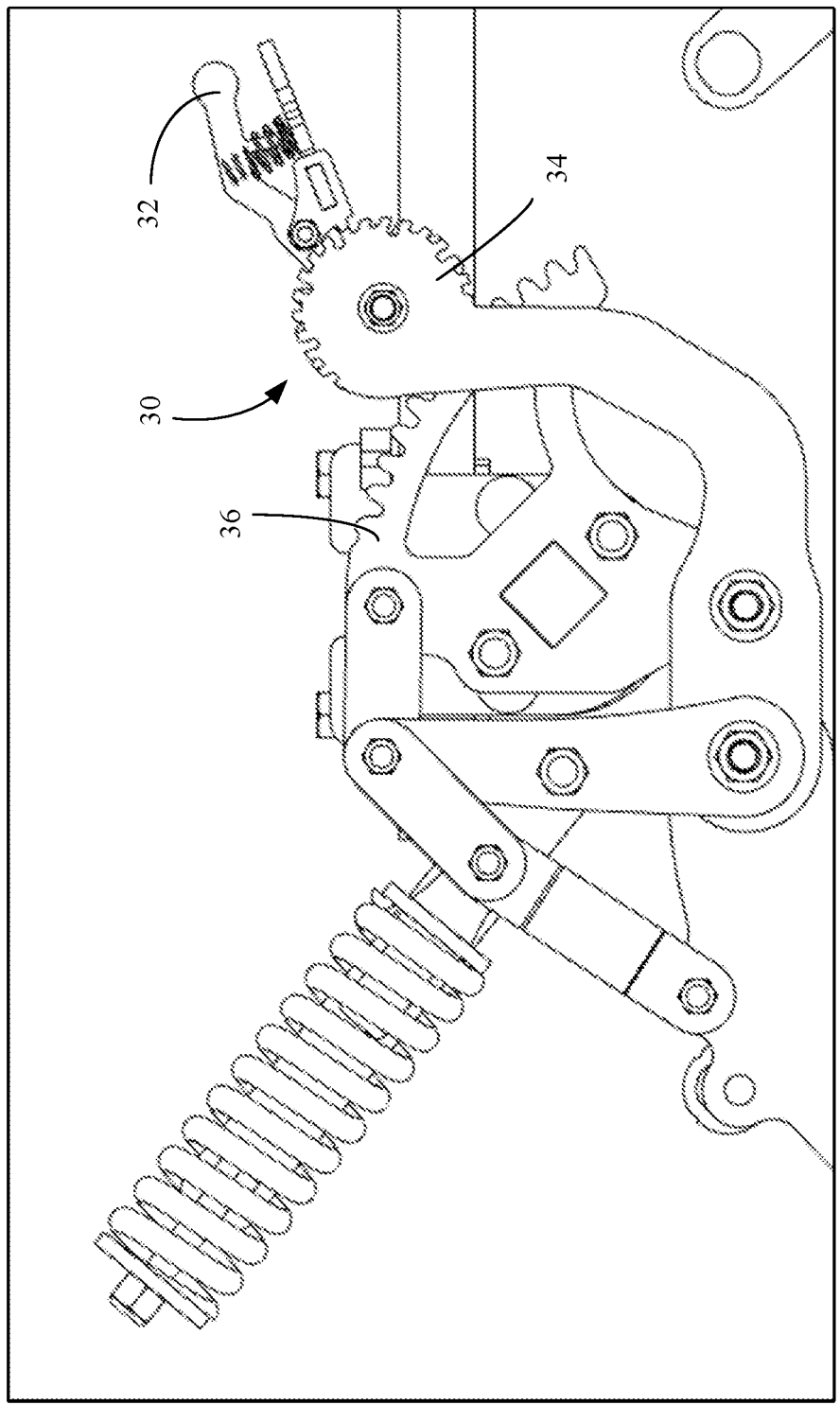
FIG. 11 is another view of the assembly for quick adjustment.
Figure 12:
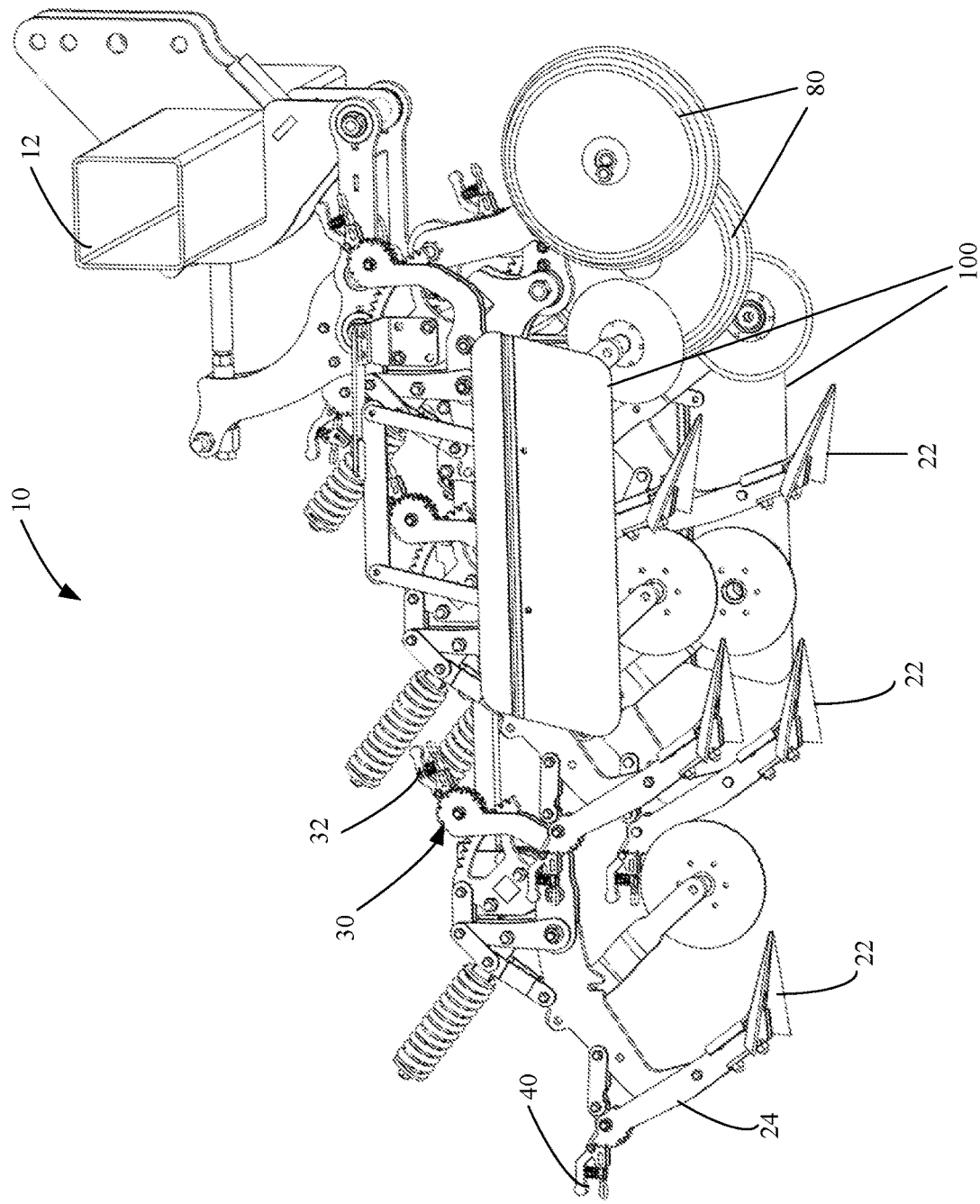
FIG. 12 is another perspective view of a cultivator row unit.
Figure 13:
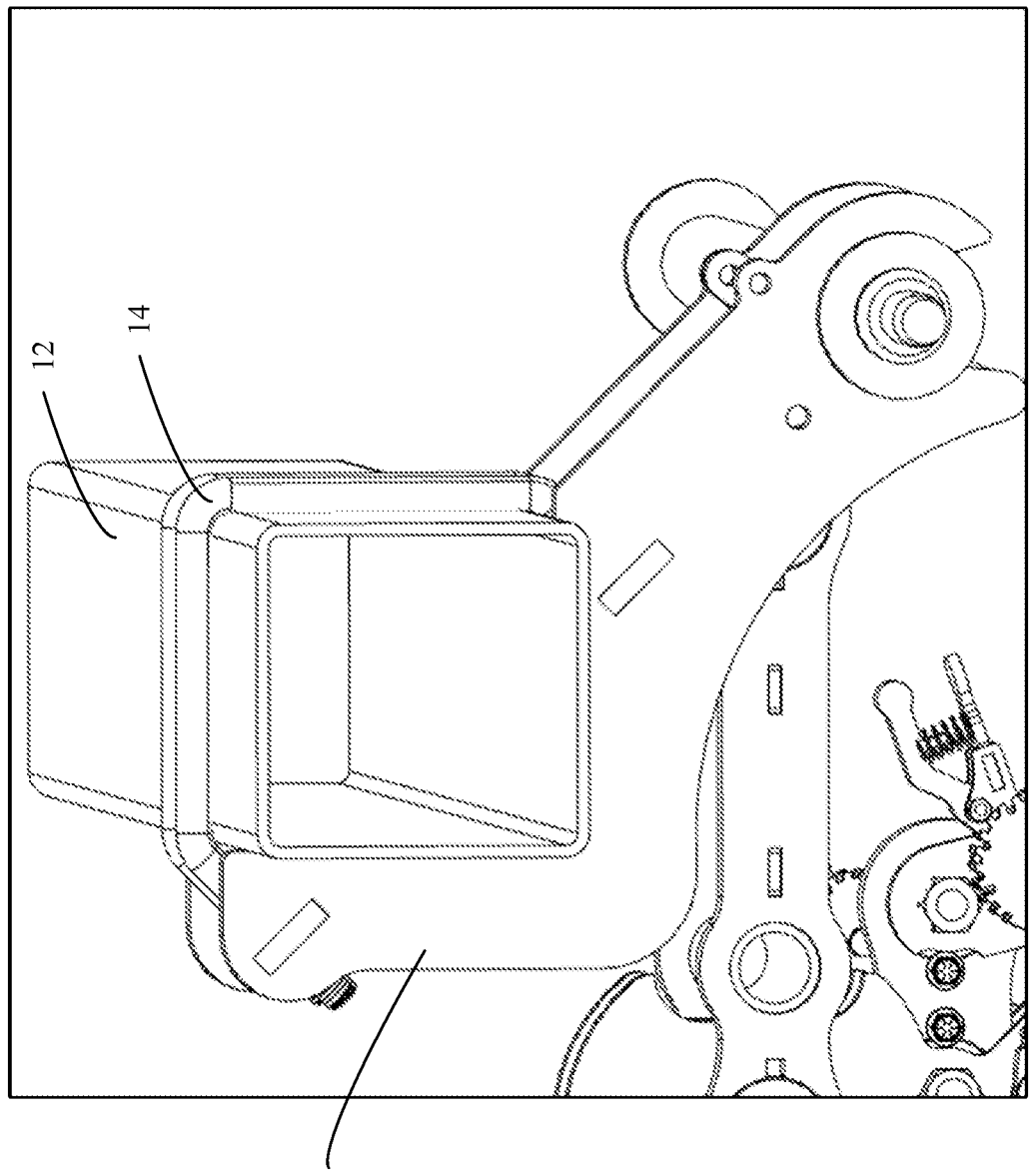
FIG. 13 is another view of mounting of a cultivator row unit to a toolbar.
Figure 14:
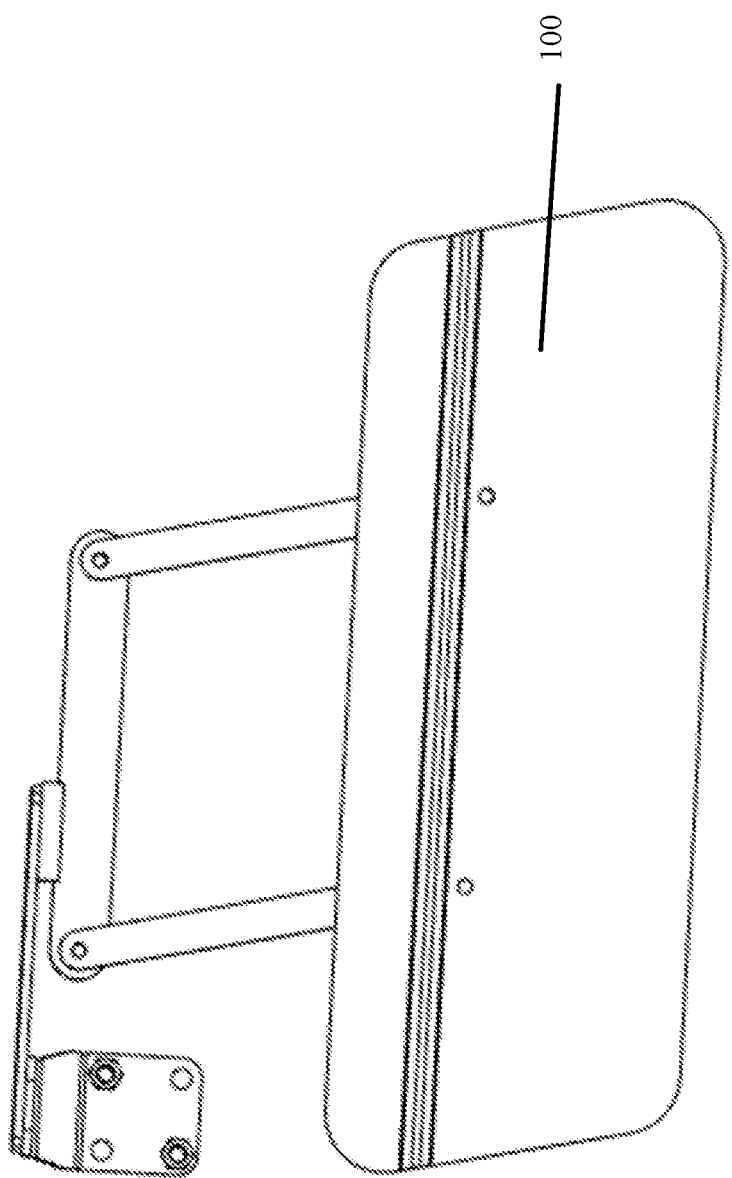
FIG. 14 is another view of the cultivator row unit showing the fender.

FIG. 11 illustrates another view of a quick adjustment assembly 30. FIG. 12 illustrates another view of the cultivator row unit 10 and further illustrates the disc 88. FIG. 13 is another view of mounting of a cultivator row unit to a toolbar 12. C-shaped bolt clamps 14 are shown for securing the bracket assemblies 23 in place. The C-shaped bolt clamps 14 are generally preferred over U-shaped bolt clamps, although other configurations are contemplated. Instead of C-shaped bolt clamps 14, V-bolt clamps may be used. In addition, the bolts may come up in the opposite direction to that which is shown. FIG. 14 is another view of the cultivator row unit showing the fender 100.

Figure 15:
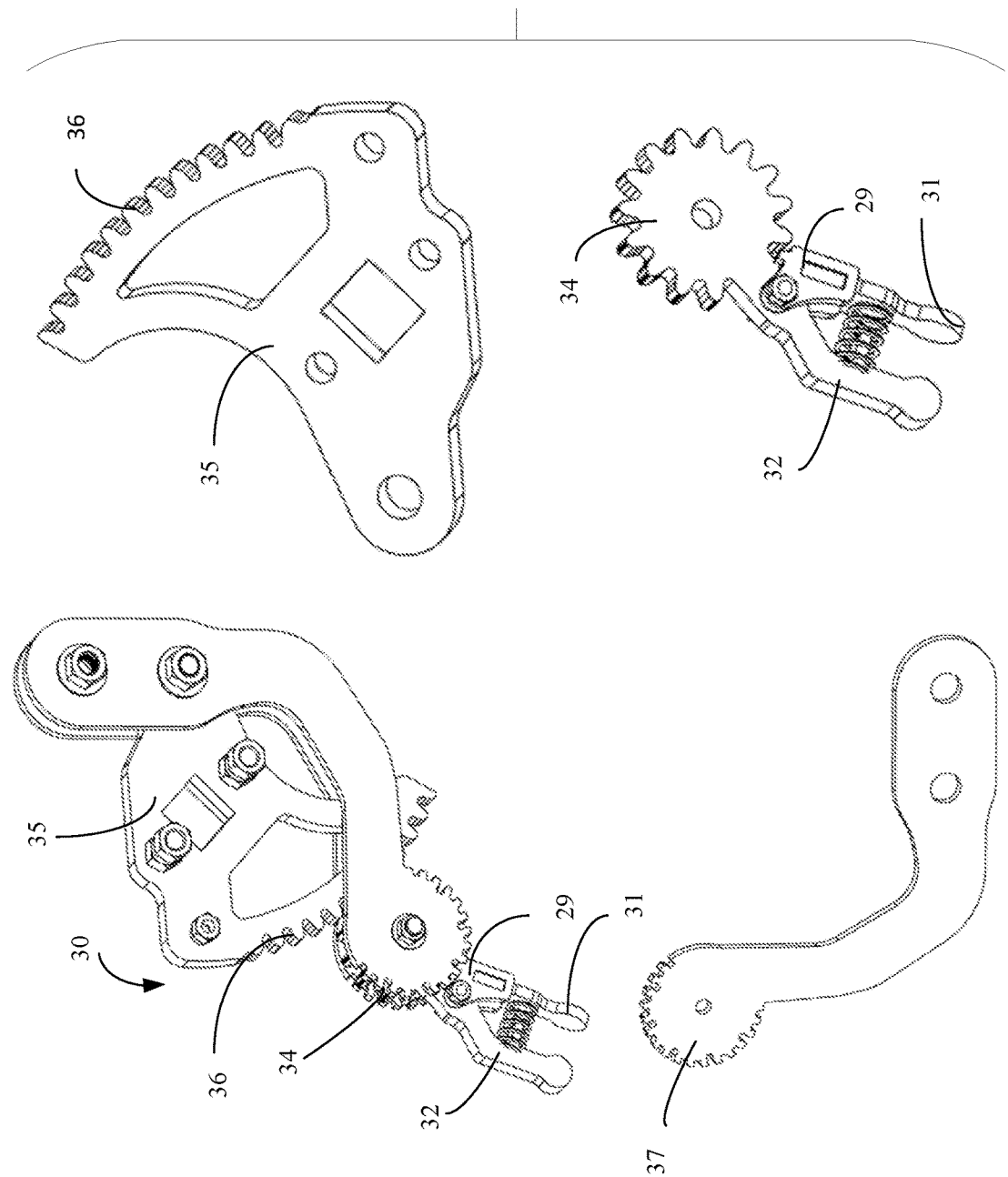
FIG. 15 is a view of a quick adjustment and component parts.
Figure 16:
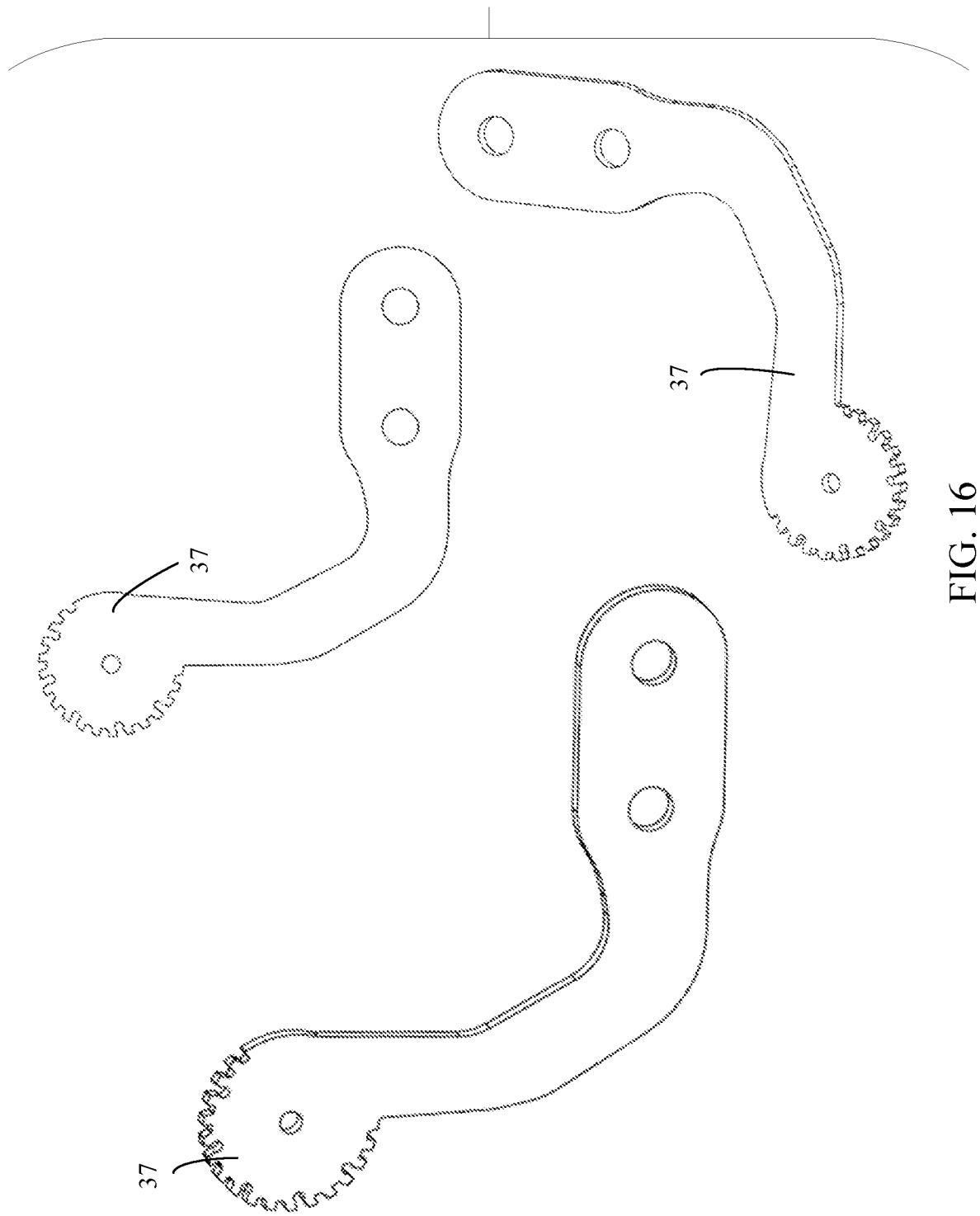
FIG. 16 illustrates the support member of a quick adjustment assembly from different angles.
Figure 17:
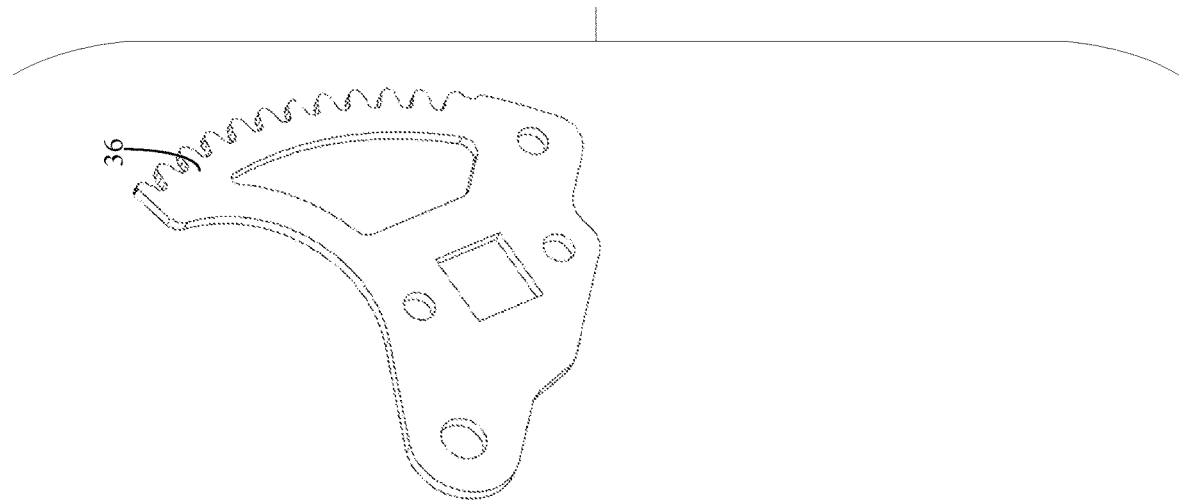
FIG. 17 illustrates the component part of the quick adjustment assembly with arcuate gearing from different angles.
Figure 17:
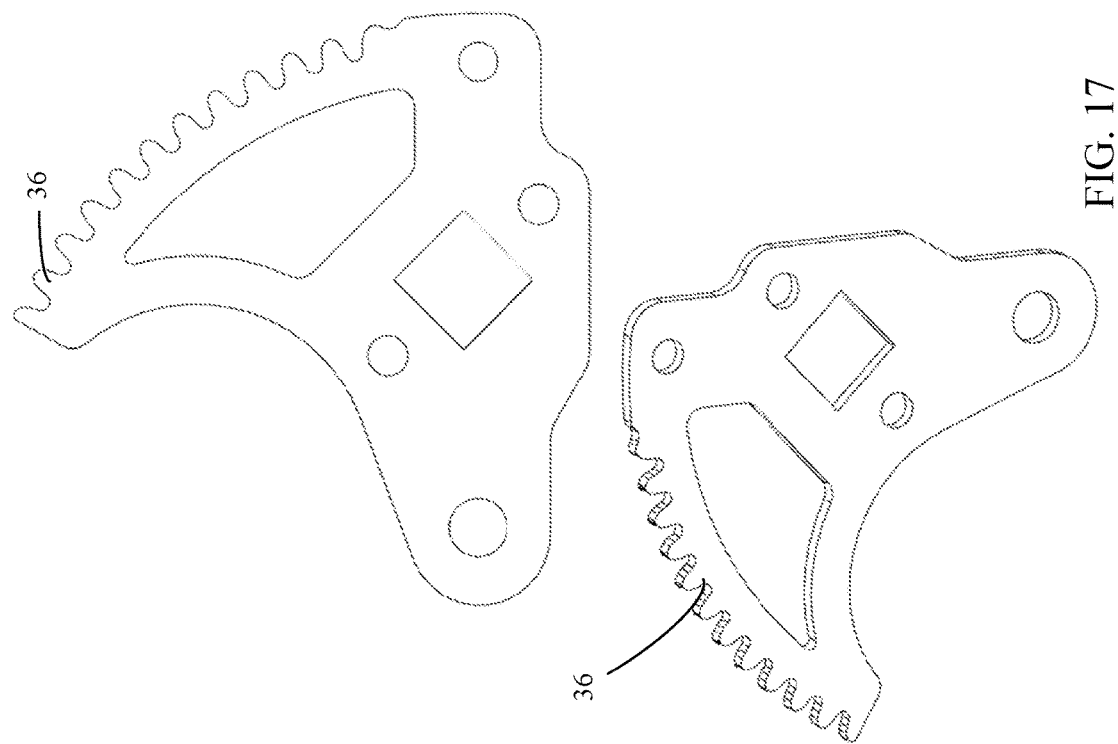
Figure 18:
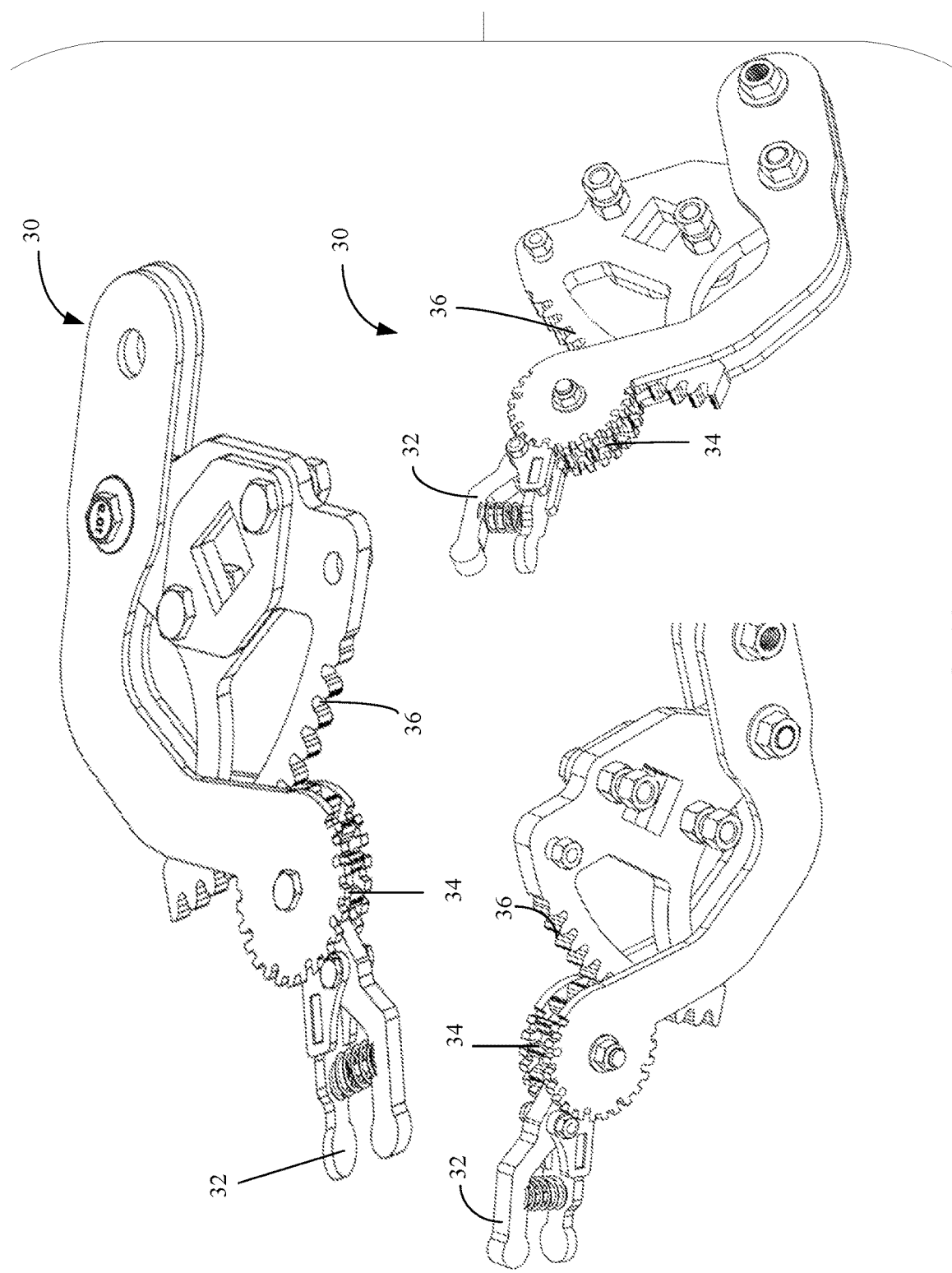
FIG. 18 provides additional views of an assembly for quick adjustment.
Figure 19:
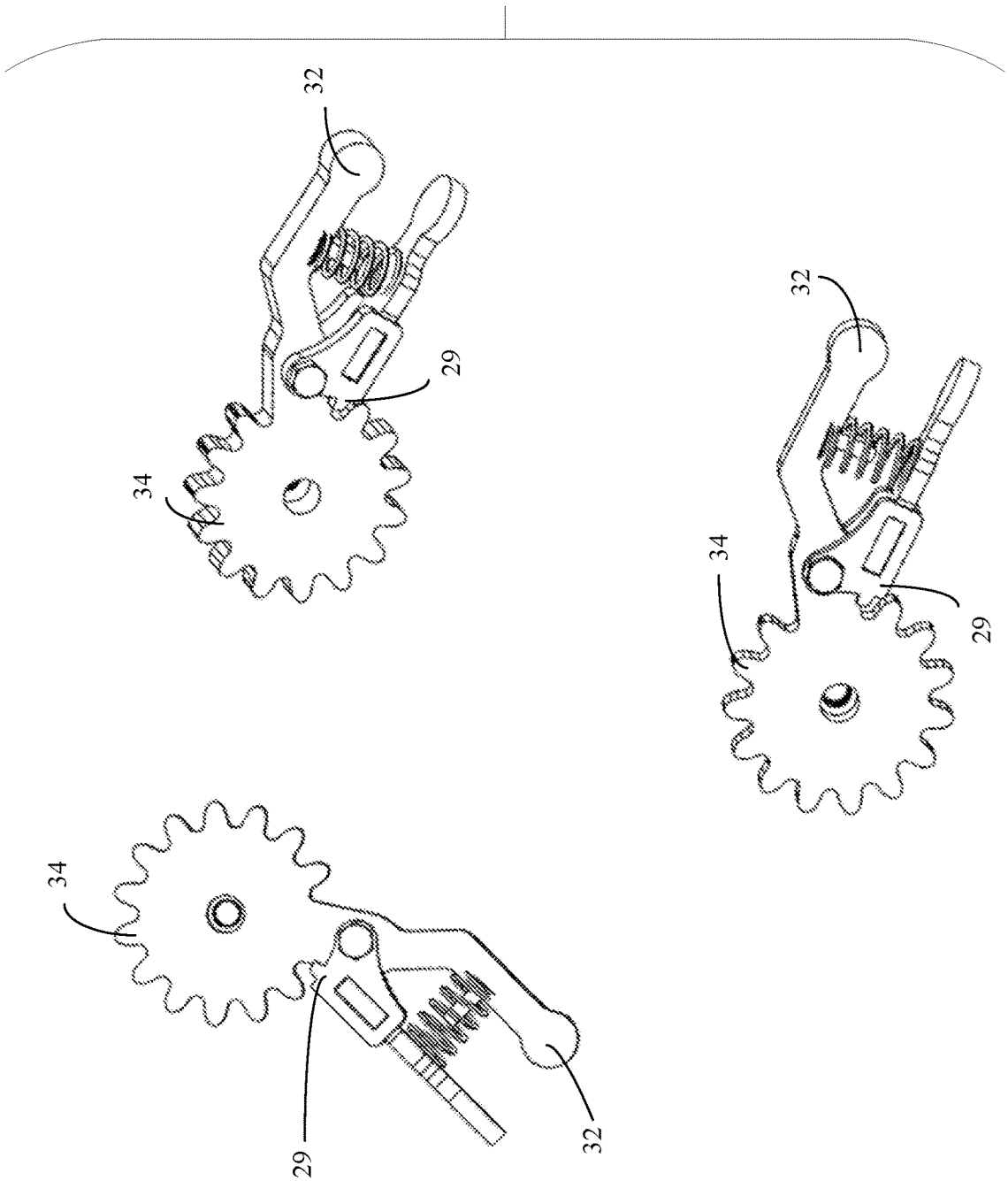
FIG. 19 provides additional views of an assembly for quick adjustment.

FIG. 15 is a view of an assembly for quick adjustment 30 and component parts including a gear 34 attached to a handle 32, a component part or linkage 35 including arcuate gearing 36, and a support member 37. In operation, a person may move the handle which causes the teeth of the gear 34 to engage the teeth of the arcuate gearing 34 on component 36. FIG. 16 illustrates the support member 37 from different angles. FIG. 17 illustrates the component part with arcuate gearing 36 from different angles. Although the teeth are shown having a particular geometry, it to be understood that the teeth may have different geometries. For example, the teeth may have sharper edges or may be smoother and rounder. The teeth may be spaced apart by greater distances or smaller distances. FIG. 18 provides additional views for the assembly for quick adjustment 30. FIG. 19 provides additional illustrations of the handle 32 and gear 34 from different angles. Note that the latch 29 is rotatably connected with handle 32 so that the latch may be rotated into place to secure the assembly for quick adjustment.

Figure 20:
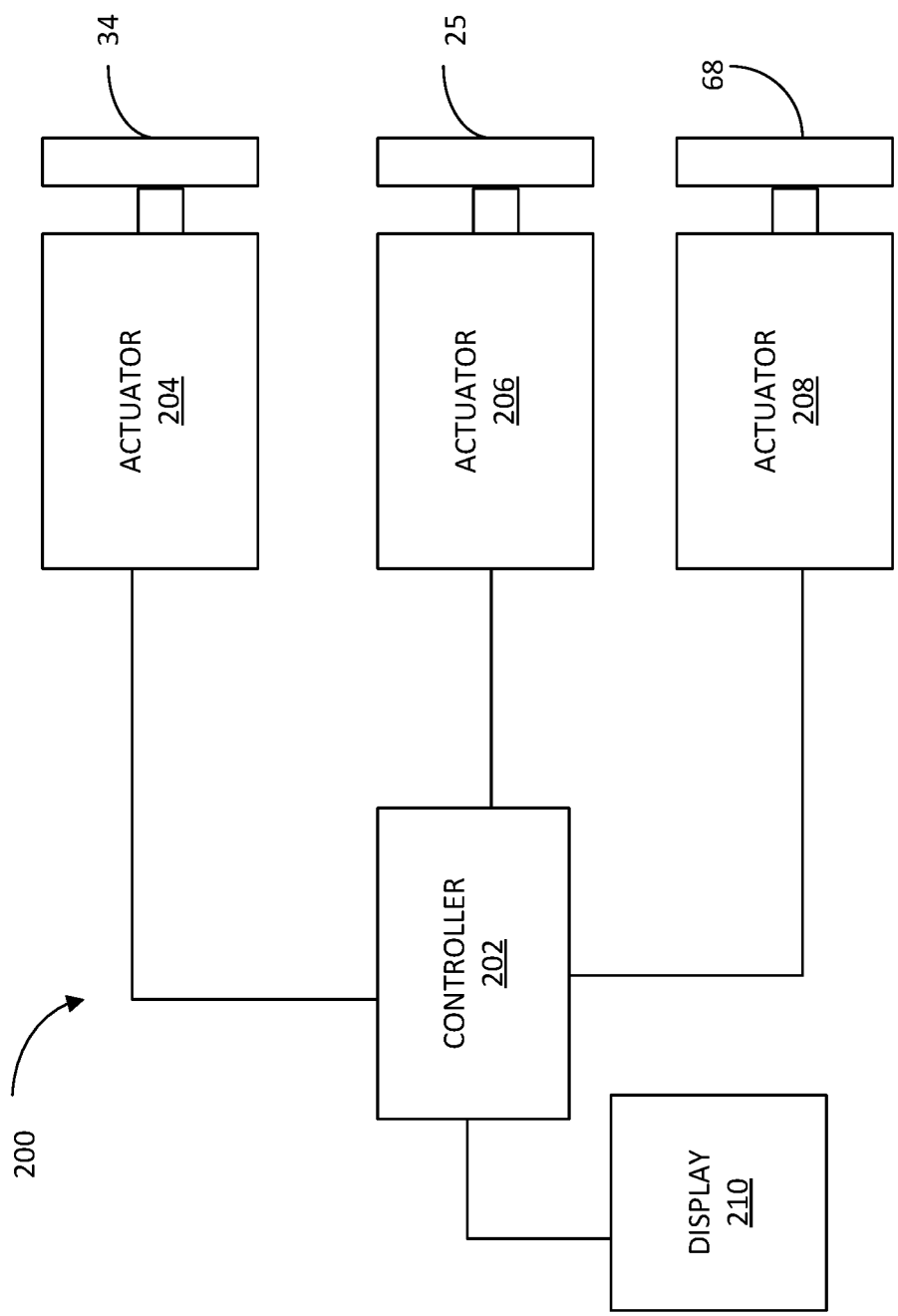
FIG. 20 shows a control system where actuators are used to drive gears.

FIG. 20 illustrates that a control system 200 which may include a controller 202 which may include one or more processors, microcontrollers, or other intelligent controls. The controller 202 may be in operative communication with one or more actuators 204, 206, 208. Each of the actuators may be a motor or other type of actuator. Each of the actuators 204, 206, 208 is used to move a respective gear 34, 25, 68. Thus, the present invention contemplates that instead of manual control of the various quick adjustments that actuators may be used to move each of the adjustments between positions. Thus, for example, an actuator may rotate a gear clockwise or counterclockwise to adjust a position. Where actuators are used, it is contemplated that the cultivator may be electronically controlled such as from a tractor or automatically to make the adjustments as directed by an operator, according to a prescription or recommendations. Although three actuators are shown, one for earth working tool depth, one for earth working tool angle, and one for depth wheel adjustment, it is to be understood that more would be present as a row unit of a cultivator may have 5 earth working tools. Thus, each row unit may, for example, have 11 different actuators. A cultivator may have multiple rows. A single controller 202 may be connected to actuators from multiple row units. A display 210 may also be operatively connected to the controller 202 and may be used for showing status of each cultivator adjustment. The display 210 or other input device may be used by an operator to select the settings for the cultivator.

Although a cultivator and assemblies which permit quick adjustment have been shown and described, it is to be understood that various options and alternatives are contemplated. This includes, for example, variations in the size, shape, and number of teeth of gearing, the ratio of gears, the size, shape, and placement of handles for the quick adjustment assemblies, whether a single or dual gauge wheels are used, the type and number of earth working tools, the number of row units, the distance the earth working tools trail the toolbar, the manner in which row units are secured to a tool bar, whether the tool bar is folding or not, the depth of notches in the gears, the manner in which stabilization is provided, the number of incremental position, the use of bushings where appropriate, the number of earth working tools associated with a row, the particular size, shape, and geometry of the earth working tool, and other variations. For example, instead of using a latch as a fastener, a pin or bolt may be used instead.

The invention is not to be limited to the particular embodiments described herein. The foregoing description has been presented for purposes of illustration and description. It is not intended to be an exhaustive list or limit any of the invention to the precise forms disclosed. It is contemplated that other alternatives or exemplary aspects are considered included in the invention. The description is merely examples of embodiments, processes or methods of the invention. It is understood that any other modifications, substitutions, and/or additions can be made, which are within the intended spirit and scope of the invention.

What is claimed is:

1. A cultivator comprising at least one cultivator row unit, each of the at least one cultivator row unit comprising:
   a support assembly for securing the cultivator row unit to a tool bar;
   a shank;
   an earth working tool operatively connected at a first end of the shank;
   arcuate gearing positioned at a second end of the shank;
   a first quick adjustment assembly configured for discrete incremental adjustment of position of the quick adjustment assembly relative to the arcuate gearing to adjust angle of the earth working tool relative to a ground plane; and
   a second quick adjustment assembly comprising a gear having teeth for meshing with arcuate gearing of a linkage and positioned to provide for incrementally adjusting position of the second quick adjustment assembly relative to the arcuate gearing of the linkage to adjust depth of the earth working tool.

2. The cultivator of claim 1 wherein the first quick assembly further comprises a handle.

3. The cultivator of claim 2 wherein the first quick assembly further comprises a fastener operatively connected to the handle to secure position of the position of the quick adjustment assembly relative to the arcuate gearing.

4. The cultivator of claim 3 wherein the fastener is a latch.

5. The cultivator of claim 1 wherein the first quick adjustment assembly comprises a first handle, a second handle, and a latch such that when the first handle and the second handle are squeezed together, the quick adjustment assembly is movable relative to the arcuate gearing.

6. The cultivator of claim 1 wherein the second quick assembly further comprises a handle integral with the gear of the second quick adjustment assembly.

7. The cultivator of claim 1 further comprising a first gauge wheel and a second gauge wheel operatively connected to a gauge wheel assembly and a third quick adjustment assembly comprising a gear having teeth for meshing with arcuate gearing of the gauge wheel assembly and positioned to provide for incrementally adjusting position of the third quick adjustment assembly relative to the arcuate gearing of the gauge wheel assembly to adjust gauge wheel depth.

8. The cultivator of claim 7 wherein the third quick assembly further comprises a handle integral with the gear of the third quick adjustment assembly.

9. The cultivator of claim 1 wherein the earth working tool comprises a shovel.

10. The cultivator of claim 1 further comprising a first and a second fender operatively connected to the support assembly.

11. A cultivator comprising at least one cultivator row unit, each of the at least one cultivator row unit comprising:
    a frame;
    a support assembly operatively connected to the frame for securing the cultivator row unit to a tool bar;
    a shank operatively connected to the frame;
    an earth working tool operatively connected to the shank;
    a gauge wheel assembly operatively connected to the frame, the gauge wheel assembly comprising a first gauge wheel and a second gauge wheel;
    at least one quick adjustment assembly positioned to mesh with teeth of arcuate gearing such that position of the quick adjustment assembly is discretely and incrementally adjustable relative to the arcuate gearing;
    wherein the at least one quick adjustment assembly for providing discrete incremental adjustment comprises a gear with teeth, a handle integral with the gear and arcuate gearing having teeth engaging the teeth of the gear;
    wherein each of the at least one quick adjustment assembly is configured for providing discrete incremental adjustment for one of (a) an angle of the earth working tool, (b) a depth of the earth working tool, and (c) a gauge wheel depth associated with the gauge wheel assembly.

12. The cultivator of claim 11 wherein the earth working tool comprises a shovel.

13. The cultivator of claim 11 further comprising a first and a second fender operatively connected to the support assembly.

14. An apparatus for use in an agricultural implement to provide discrete incremental adjustment without use of tools, the apparatus comprising:
    an arcuate member with teeth extending outwardly therefrom;
    a gear having teeth for engaging the teeth of the arcuate member;
    a handle integral with the gear;
    a first support member and a second support member on opposite sides of the gear having teeth; and
    a fastener for securing the gear to the arcuate member such that in a fastened position the faster engages the teeth of the gear thereby preventing rotation of the gear relative to the arcuate member.

15. The apparatus of claim 14 wherein the fastener is a latch.

16. A row unit for a cultivator comprising the apparatus of claim 14 wherein the apparatus is configured for providing discrete incremental adjustment for one of (a) an angle of the earth working tool, (b) a depth of the earth working tool, and (c) a gauge wheel depth associated with the gauge wheel assembly.

17. A cultivator comprising the row unit of claim 16.

* * * * *